(12) United States Patent
Ross et al.

(10) Patent No.: US 10,521,488 B1
(45) Date of Patent: Dec. 31, 2019

(54) DYNAMIC PARTITIONING

(71) Applicant: X Development LLC, Mountain View, CA (US)

(72) Inventors: Jonathan Ross, Menlo Park, CA (US); Charles Henry Leichner, IV, Palo Alto, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/811,042

(22) Filed: Nov. 13, 2017

Related U.S. Application Data

(60) Provisional application No. 62/440,613, filed on Dec. 30, 2016.

(51) Int. Cl.
| | |
|---|---|
| *G06F 17/16* | (2006.01) |
| *G06F 15/80* | (2006.01) |
| *G06N 3/04* | (2006.01) |
| *G06F 9/50* | (2006.01) |

(52) U.S. Cl.
CPC ............ *G06F 17/16* (2013.01); *G06F 9/5061* (2013.01); *G06F 15/8046* (2013.01); *G06N 3/04* (2013.01)

(58) Field of Classification Search
None
See application file for complete search history.

(56) References Cited

U.S. PATENT DOCUMENTS

| | | | |
|---|---|---|---|
| 9,697,463 B2 | 7/2017 | Ross et al. | |
| 9,805,303 B2 | 10/2017 | Ross et al. | |
| 2011/0125819 A1* | 5/2011 | Mazahreh | G06F 17/16 708/207 |
| 2016/0342889 A1 | 11/2016 | Thorson et al. | |
| 2016/0342890 A1 | 11/2016 | Young | |
| 2016/0342891 A1 | 11/2016 | Ross et al. | |
| 2016/0342892 A1 | 11/2016 | Ross | |
| 2017/0192481 A1* | 7/2017 | Vorbach | G06F 1/324 |
| 2018/0336165 A1* | 11/2018 | Phelps | G06F 17/16 |

* cited by examiner

*Primary Examiner* — David H Malzahn
(74) *Attorney, Agent, or Firm* — Fish & Richardson P.C.

(57) ABSTRACT

A matrix computation unit includes a systolic array of cells arranged along a first and second dimension, in which the systolic array of cells includes a first multiple of cells, each cell of the first multiple of cells including: a weight register configured to store a weight input; multiple activation registers, each activation register of the multiple activation registers configured to store a corresponding activation input; multiplexer circuitry communicatively coupled to the multiple activation registers and configured to select, from the multiple activation registers, one of the activation inputs as a selected activation input; and multiplication circuitry communicatively coupled to the weight register and to the multiplexer, in which the multiplication circuitry is configured to output a product of the weight input and the selected activation input.

20 Claims, 11 Drawing Sheets

DYNAMIC PARTITIONING

CROSS-REFERENCE TO RELATED APPLICATIONS

This application claims priority to and benefit of U.S. Application Ser. No. 62/440,613, filed on Dec. 30, 2016, the entire contents of which are hereby incorporated by reference.

TECHNICAL FIELD

The present disclosure relates to dynamic partitioning of matrix multiplication units.

BACKGROUND

Neural networks are machine learning models that employ one or more layers of models to generate an output, e.g., a classification, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters.

Some neural networks include one or more convolutional neural network layers. Each convolutional neural network layer has an associated set of kernels. Each kernel includes values established by a neural network model created by a user. In some implementations, kernels identify particular image contours, shapes, or colors. Kernels can be represented as a matrix structure of weight inputs. Each convolutional layer can also process a set of activation inputs. The set of activation inputs can also be represented as a matrix structure.

Some existing systems perform computations for a given convolutional layer in software. For example, the software can apply each kernel for the layer to the set of activation inputs. That is, for each kernel, the software can overlay the kernel, which can be represented multi-dimensionally, over a first portion of activation inputs, which can be represented multi-dimensionally. The software can then compute a dot product from the overlapped elements. The dot product can correspond to a single activation input, e.g., an activation input element that has an upper-left position in the overlapped multi-dimensional space. For example, using a sliding window, the software then can shift the kernel to overlay a second portion of activation inputs and calculate another dot product corresponding to another activation input. The software can repeatedly perform this process until each activation input has a corresponding dot product. In some implementations, the dot products are input to an activation function, which generates activation values. The activation values can be combined, e.g., pooled, before being sent to a subsequent layer of the neural network.

One way of computing convolution calculations requires numerous matrix multiplications in a large dimensional space. A processor can compute matrix multiplications through a brute force method. For example, although compute-intensive and time-intensive, the processor can repeatedly calculate individual sums and products for convolution calculations. The degree to which the processor parallelizes calculations is limited due to its architecture.

SUMMARY

Various implementations include one or more of the following advantages. For example, in some implementations, a matrix computation unit may be partitioned into distinct and unique sub-units of matrix computation, in which each sub-unit is capable of independently and simultaneously performing a matrix computation on different matrix values. Furthermore, partitioning allows, in some implementations, computations among matrices having sizes that do not match the size of the matrix computation unit, without the need to load dummy values. Accordingly, partitioning may provide more efficient matrix computation operations. Partitioning may include vertical partitioning, horizontal partitioning, and/or a combination of both vertical and horizontal partitioning.

In general, the subject matter of the present disclosure can be embodied in a matrix computation unit including a systolic array of cells arranged along a first and second dimension, in which the systolic array of cells includes a first multiple of cells, each cell of the first plurality of cells including: a weight register configured to store a weight input; multiple activation registers, each activation register of the multiple activation registers configured to store a corresponding activation input; multiplexer circuitry communicatively coupled to the multiple activation registers and configured to select, from the multiple activation registers, one of the activation inputs as a selected activation input; and multiplication circuitry communicatively coupled to the weight register and to the multiplexer, in which the multiplication circuitry is configured to output a product of the weight input and the selected activation input.

Implementations of the matrix computation unit may include one or more of the following features. For example, in some implementations, each cell of the first multiple of cells includes a vertical partition register communicatively coupled to the multiplexer circuitry and configured to store a multiplexer control signal. The matrix multiplication unit may include a first mux select register communicatively coupled to a first cell of the first multiple of cells, the first mux select register being configured to provide a first multiplexer control signal to a first vertical partition register of the first cell. The first cell may be configured to pass the mux select value to a next adjacent cell of the first multiple of cells.

In some implementations, the matrix computation unit includes a first value loader communicatively coupled to a first cell of the first multiple of cells, in which the first value loader is configured to simultaneously provide multiple activation inputs to the multiple activation registers within the first cell, respectively. The first cell may be configured to pass the multiple activation inputs to a next adjacent cell of the first multiple of cells.

In general, in some aspects, the subject matter of the present disclosure may be embodied in a matrix computation unit including a systolic array of cells arranged along a first and second dimension, in which the systolic array of cells includes a first multiple of cells, each cell of the first multiple of cells including: weight register configured to store a weight input; multiplication circuitry communicatively coupled to the weight register, in which the multiplication circuitry is configured to output a product of the weight input and an activation input; a sum-in register configured to store a previously summed value; summation circuity communicatively coupled to the multiplication circuitry and to the sum-in register, in which the summation circuitry is configured to output a sum of the product and the previously summed value; demultiplexer circuitry communicatively coupled to the summation circuitry, in which the demultiplexer circuitry is configured to send the sum from the summation circuitry to another sum-in register in a second adjacent cell of the systolic array of cells along the second dimension or send the sum to an escape line depending on a value of a demultiplexer control signal received by the demultiplexer. Each cell of the first multiple of cells may include a horizontal partition register communicatively coupled to the demultiplexer circuitry, in which the horizontal partition register is configured to store a demultiplexer control signal and to send the stored demultiplexer control signal to the demultiplexer. The matrix computation unit may include a first demux select register communicatively coupled to a first cell of the first multiple of cells, the first demux select register being configured to provide a first demultiplexer control signal to a first horizontal partition register of the first cell. The matrix computation unit may include multiple sum registers, in which each escape line of the first multiple of cells is communicatively coupled to a different corresponding sum register of the plurality of sum registers. Each escape line of the first multiple of cells may be communicatively coupled to a vector computation unit.

In general, in some aspects, the subject matter of the present disclosure may be embodied in methods for performing computations using a matrix computation unit including a systolic array of cells arranged along a first and a second dimension, the methods including: sending a first multiple of activation inputs to a first multiple of activation registers, respectively, within a first cell of the systolic array of cells; sending a first weight input to the first cell; sending a first multiplexer control signal to first multiplexer circuitry within the first cell, the first multiplexer circuitry being communicatively coupled to the first plurality of activation registers; selecting, at the first multiplexer circuitry, a first activation input from the first multiple of activation registers, based on the first multiplexer control signal; and obtaining a first product of the first weight input and the first activation input.

Implementations of the methods may include one or more of the following features. For example, in some implementations, the methods may include sending the first multiple of activation inputs to a second multiple of activation registers, respectively, within a second cell of the systolic array of cells; sending a second weight input to the second cell; sending a second multiplexer control signal to second multiplexer circuitry within the second cell, the second multiplexer circuitry being communicatively coupled to the second multiple of activation registers; selecting, at the second multiplexer circuitry, a second activation input from the second multiple of activation registers, based on the second multiplexer control signal; and obtaining a second product of the first weight input and the first activation input.

In some implementations, the methods include sending the first multiple of activation inputs from the first multiple of activation registers to the second multiple of activation registers, respectively.

In general, in some aspects, the subject matter of the present disclosure may be embodied in methods for performing computations using a matrix computation unit including a systolic array of cells arranged along a first and a second dimension, the methods including: sending a first activation input to a first cell of the systolic array of cells; sending a first weight input to the first cell; obtaining a first product of the first weight input and the first activation input; obtaining a first accumulated sum based on the first product; sending the first accumulated sum to demultiplexer circuitry within the first cell; receiving a demultiplexer control signal at the demultiplexer circuitry; and sending the first accumulated sum from the demultiplexer circuitry within the first cell to another sum-in register in a second adjacent cell along the second dimension or sending the accumulated sum to an escape line, depending on the value of the demultiplexer control signal.

Implementations of the methods may include one or more of the following features. For example, in some implementations, the methods include: receiving, at the first cell, from a third adjacent cell along the second dimension, a previously summed value; and obtaining the first accumulated sum by combining the previously summed value with the first product at summation circuitry within the first cell.

In some implementations, sending the accumulated sum to the escape line includes sending the accumulated sum to a sum register communicatively coupled to the escape line.

In some implementations, sending the accumulated sum to the escape line includes sending the accumulated sum to a vector computation unit communicatively coupled to the escape line.

In general, in some aspects, the subject matter of the present disclosure may be embodied in methods for dynamically partitioning a matrix computation unit including a systolic array of cells arranged along a first dimension and a second dimension, the method including: sending multiple activation inputs to each cell of a first multiple of cells along the first dimension; selecting, at multiplexer circuitry within a first cell of the first multiple of cells, a first activation input from the multiple activation inputs, and selecting at multiplexer circuitry within a second cell of the first multiple of cells a second activation input from the multiple activation inputs; obtaining, from each cell of the first multiple of cells along the first dimension, an accumulated sum based on the activation input selected in the cell; sending the accumulated sum obtained in the first cell to demultiplexer circuitry within the first cell; and sending the accumulated sum from the demultiplexer circuitry within the first cell to an escape line or to another sum-in register in another adjacent cell along the second dimension, depending on a value of a demultiplexer control signal.

Implementations of the methods may include one or more of the following features. For example, in some implementations, the methods include: sending, to the multiplexer circuitry within the first cell, a first multiplexer control signal, in which selecting the first activation input is based on a value of the first multiplexer control signal; and sending, to the multiplexer circuitry within the second cell, a second different multiplexer control signal, in which selecting the second activation input is based on a value of the second different multiplexer control signal.

In some implementations, the methods include sending the demultiplexer control signal to the demultiplexer circuitry, in which the demultiplexer circuitry sends the accumulated sum to the escape line when the demultiplexer control signal has a first value, and in which the demultiplexer circuitry sends the accumulated sum to the another sum-in register when the demultiplexer control signal has a second different value.

The details of one or more embodiments of the invention are set forth in the accompanying drawings and the description below. Other features will be apparent from the description, the drawings, and the claims.

BRIEF DESCRIPTION OF THE DRAWINGS

Like reference numbers and designations in the various drawings indicate like elements.

DETAILED DESCRIPTION

The example implementations described herein concern dynamic partitioning of matrix multiplication units. However, the subject matter of the present disclosure may relate to dynamic partitioning of any regular grids of compute.

A neural network having multiple layers may be used to compute inferences. For example, given an input, the neural network may compute an inference for the input. The neural network computes this inference by processing the input through each of the layers of the neural network. In particular, in some implementations, the layers of the neural network are arranged in a sequence, each with a respective set of weights. Each layer receives an input and processes the input in accordance with the set of weights for the layer to generate an output.

Therefore, in order to compute an inference from a received input, the neural network receives the input and processes it through each of the neural network layers in the sequence to generate the inference, with the output from one neural network layer being provided as input to the next neural network layer. Data inputs to a neural network layer, e.g., either the input to the neural network or the outputs of the layer below the layer in the sequence, to a neural network layer can be referred to as activation inputs to the layer.

In some implementations, the layers of the neural network are arranged in a directed graph. That is, any particular layer may receive multiple inputs, may output multiple outputs, or both. The layers of the neural network may also be arranged such that an output of a layer is sent back as an input to a previous layer.

Figure 1:
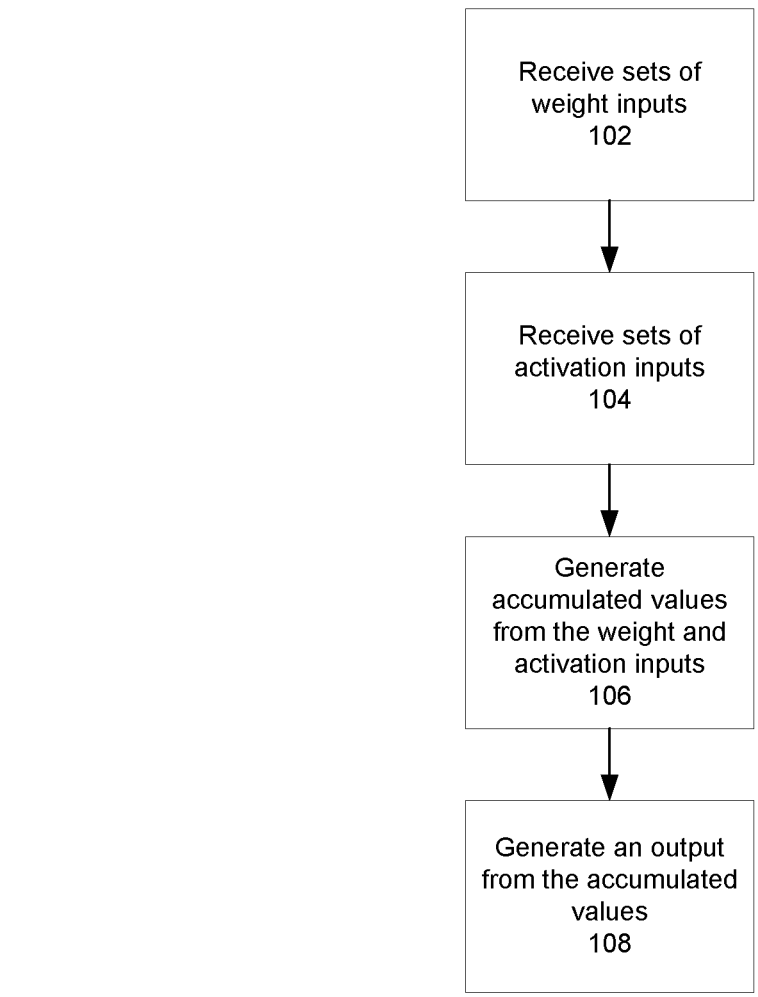
FIG. 1 is a flow diagram of an example process for performing a computation for a given layer of a neural network using a special-purpose hardware circuit.

FIG. 1 is a flow diagram of an example process 100 for performing a computation for a given layer of a neural network using a special-purpose hardware circuit. For convenience, the method 100 will be described with respect to a system having one or more circuits that performs the method 100. The method 100 can be performed for each layer of the neural network in order to compute an inference from a received input.

The system receives sets of weight inputs (step 102) and sets of activation inputs (step 104) for the given layer. The sets of weight inputs and the sets of activation inputs may be received from dynamic memory and a unified buffer, respectively, of the special-purpose hardware circuit. In some implementations, both the sets of weight inputs and the sets of activation inputs may be received from the unified buffer.

The system generates accumulated values from the weight inputs and the activation inputs using a matrix multiplication unit of the special-purpose hardware circuit (step 106). In some implementations, the accumulated values are dot products of the sets of weight inputs and the sets of activation inputs. That is, for one set of weights, the system can multiply each weight input with each activation input and sum the products together to form an accumulated value. The system can then compute dot products of other set of weights with other sets of activation inputs.

The system can generate a layer output from the accumulation values (step 108) using a vector computation unit of the special-purpose hardware circuit. In some implementations, the vector computation unit applies an activation function to the accumulated values. The output of the layer can be stored in the unified buffer for use as an input to a subsequent layer in the neural network or can be used to determine the inference. The system finishes processing the neural network when a received input has been processed through each layer of the neural network to generate the inference for the received input.

Figure 2:
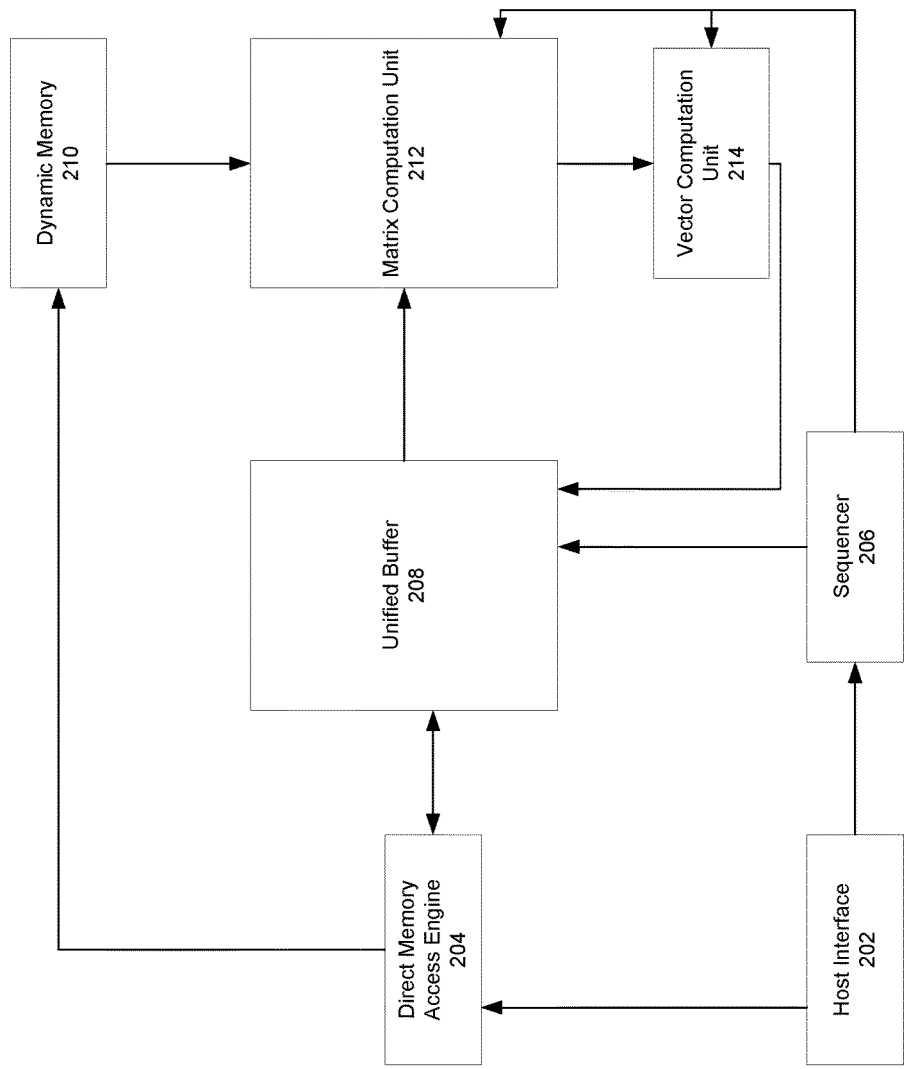
FIG. 2 shows an example neural network processing system.

FIG. 2 shows an example special-purpose integrated circuit 200 for performing neural network computations. The system 200 includes a host interface 202. The host interface 202 can receive instructions that include parameters for a neural network computation. The parameters can include at least one or more of the following: how many layers should be processed, corresponding sets of weight inputs for each layer of the layer, an initial set of activation inputs, i.e., the input to the neural network from which the inference is to be computed, corresponding input and output sizes of each layer, a stride value for the neural network computation, and a type of layer to be processed, e.g., a convolutional layer or a fully connected layer.

The host interface 202 can send the instructions to a sequencer 206, which converts the instructions into low level control signals that control the circuit to perform the neural network computations. In some implementations, the control signals regulate dataflow in the circuit, e.g., how the sets of weight inputs and the sets of activation inputs flow through the circuit. The sequencer 206 can send the control signals to a unified buffer 208, a matrix computation unit 212, and a vector computation unit 214. In some implementations, the sequencer 206 also sends control signals to a direct memory access engine 204 and dynamic memory 210. In some implementations, the sequencer 206 is a processor that generates clocked signals. The sequencer 206 can use timing of the clocked signals to, at appropriate times, send the control signals to each component of the circuit 200. In some other implementations, the host interface 202 passes in a clocked signal from an external processor.

The host interface 202 can send the sets of weight inputs and the initial set of activation inputs to the direct memory access engine 204. The direct memory access engine 204 can store the sets of activation inputs at the unified buffer 208. In some implementations, the direct memory access stores the sets of weights to dynamic memory 210, which can be a memory unit. In some implementations, the dynamic memory is located off of the circuit.

The unified buffer 208 is a memory buffer. It can be used to store the set of activation inputs from the direct memory access engine 204 and outputs of the vector computation unit 214. The direct memory access engine 204 can also read the outputs of the vector computation unit 214 from the unified buffer 208.

The dynamic memory 210 and the unified buffer 208 can send the sets of weight inputs and the sets of activation inputs, respectively, to the matrix computation unit 212. In some implementations, the matrix computation unit 212 is a two-dimensional systolic array. For example, the matrix computation unit 212 may be a two-dimensional systolic array of cells. In some implementations, the matrix computation unit 212 is a general purpose matrix processor.

The matrix computation unit 212 can process the weight inputs and the activation inputs and provide a vector of outputs to the vector computation unit 214. In some implementations, the matrix computation unit sends the vector of outputs to the unified buffer 208, which sends the vector of outputs to the vector computation unit 214. The vector computation unit can process the vector of outputs and store a vector of processed outputs to the unified buffer 208. For example, the vector computation unit 214 can apply a non-linear function to outputs of the matrix computation unit, e.g., a vector of accumulated values, to generate activated values. In some implementations, the vector computation unit 214 generates normalized values, pooled values, or both. The vector of processed outputs can be used as activation inputs to the matrix computation unit 212, e.g., for use in a subsequent layer in the neural network.

In general, it is not always the case that a matrix computation will fit perfectly within a matrix computation unit. For instance, a matrix computation unit may contain a systolic array of 256×256 cells, in which each cell is configured to perform a mathematical operation (e.g., multiplication and summation) between input values from a first matrix and input values from a second matrix. Thus, as designed, the cells of the example matrix computation unit can efficiently perform a matrix multiplication operation between two matrices each having a size of 256×256. However, for a matrix multiplication operation between matrices having different sizes, such as between a 256×256 matrix and a 256×257 matrix, the matrix computation unit may perform at least some calculations in which less than all the cells of the of the matrix computation unit are needed. In such cases, dummy values are loaded into the unused cells. The matrix computation unit still utilizes energy and time to perform the computation with the dummy values but does not provide any useful output from those operations.

To address the foregoing operating inefficiency, a matrix computation unit may be designed so that it can be dynamically partitioned. Dynamic partitioning may include different types of partitioning. Vertical partitioning occurs when the cells of the matrix computation unit are divided along a first dimension (e.g., into columns), with each sub-unit or partition receiving and operating on separate activation inputs. Dynamic partitioning may alternatively, or in addition, include horizontal partitioning in which the cells of the matrix computation unit are divided along a second dimension (e.g., into rows). The division between horizontal sub-units partitions may be determined based on whether the output of a mathematical operation performed by the cell is provided to an adjacent cell along the second dimension or is output from the matrix computation unit. Each sub-unit or partition formed from the vertical and horizontal partitioning may operate independently from and simultaneously with the other sub-units or partitions of the matrix computation unit. In some cases, even a single cell of the matrix computation unit may be dynamically configured to act independently from and simultaneously with the remainder of the matrix computation unit. Furthermore, the dynamic partitioning described herein may be configured on a run-time basis, in which the specific partitioning of the matrix computation unit can be updated upon the occurrence of a clock cycle.

The structure and operation of dynamically reconfigurable matrix computation units will be described in more detail below with reference to FIG. 3, FIG. 4, FIG. 5, FIG. 6, and FIG. 7.

Figure 3:
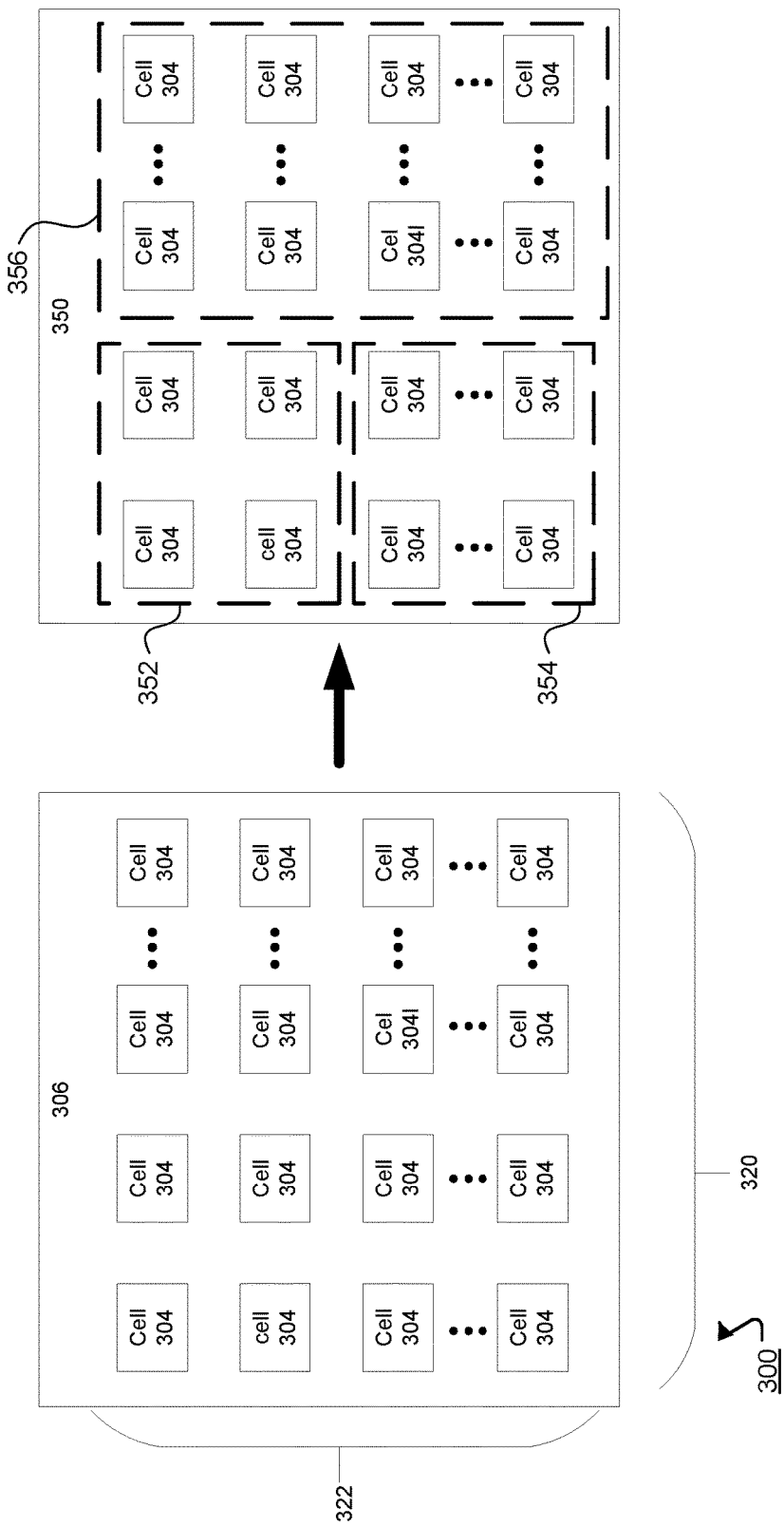
FIG. 3 shows an example of partitioning a matrix computation unit.

FIG. 3 shows an example architecture 300 including a dynamically reconfigurable matrix computation unit. The matrix computation unit is a two-dimensional systolic array 306. The array 306 includes multiple cells 304. In some implementations, a first dimension 320 of the systolic array 306 corresponds to columns of cells and a second dimension 322 of the systolic array 306 corresponds to rows of cells. The systolic array 306 can have more rows than columns, more columns than rows, or an equal number of columns and rows.

The systolic array 306 may operate as a single matrix computation unit in which all cells 304 of the array participate in a computation between two separate matrices. Alternatively, the systolic array 306 may be dynamically reconfigured to include multiple matrix computation sub-units or partitions, each of which operates simultaneously and independently on different pairs of matrices. For example, the systolic array 306 may be reconfigured as shown in array 350, where the dashed lines indicate different sub-units of the array. A first sub-unit 352 is composed of two rows of cells along two columns. A second sub-unit 354 is composed of the remaining rows of cells beneath the first sub-unit 352 along the same two columns. A third sub-unit 356 is composed of multiple rows of cells along the remaining columns of the systolic array.

The reconfiguration shown in FIG. 3 is a result of a combination of horizontal and vertical partitioning. For example, the array 306 has been vertically partitioned between two left most columns of cells and any remaining cells to the right of the vertical partition. Similarly, the array 306 has been horizontally partitioned, for only the first two columns of the array, between the top two rows of cells and any remaining cells beneath the top two rows of cells. Though array 350 is shown as being sub-divided into three separate matrix computation sub-units, other numbers of matrix computation sub-units may be created through dynamic configuration of the array 306. In some implementations, a matrix computation sub-unit may be constituted by a single cell of the array. Further details of vertical and horizontal partitioning will now be described.

Figure 4:
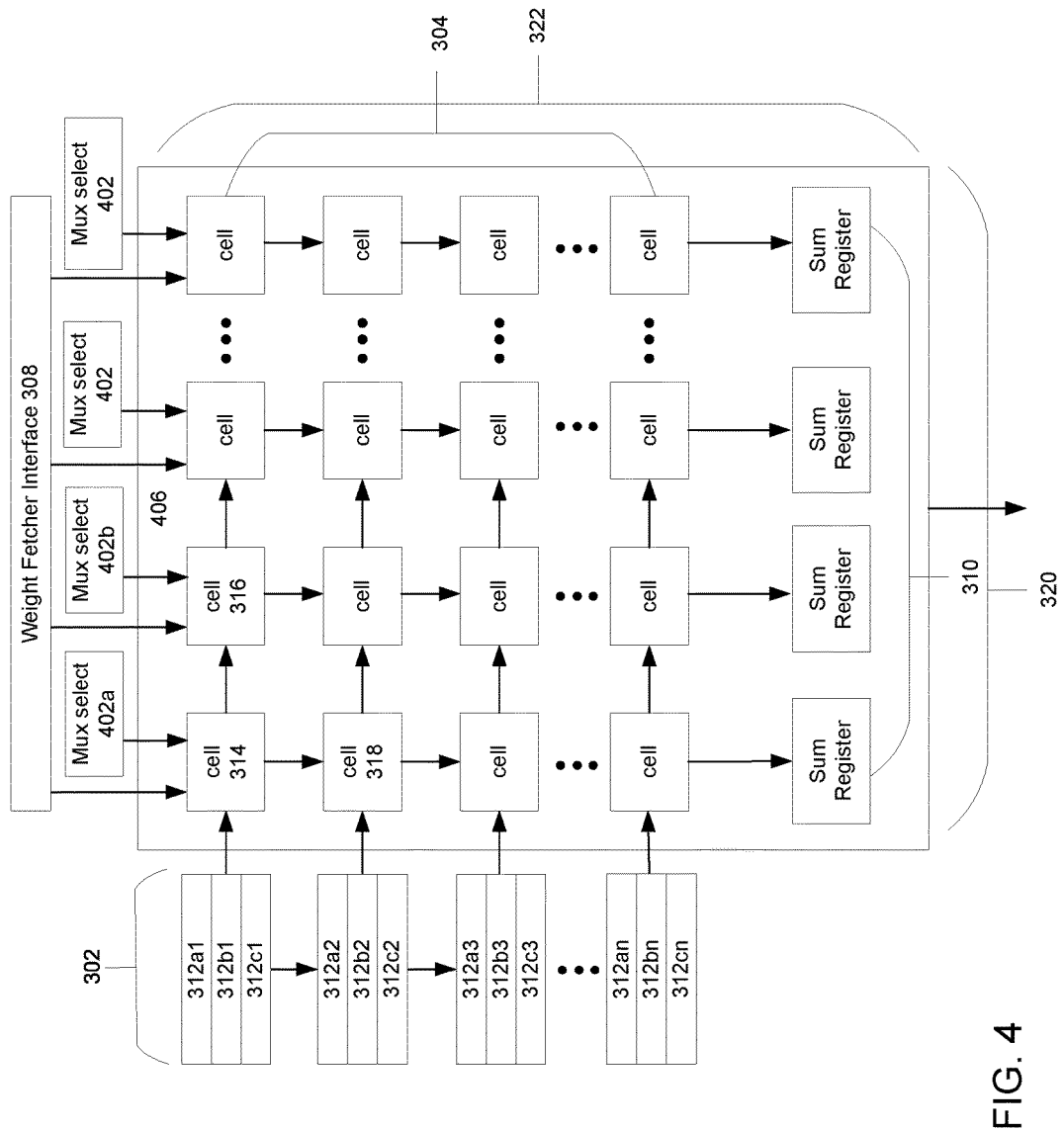
FIG. 4 shows an example architecture including a matrix computation unit.

FIG. 4 shows an example architecture 400 including a matrix computation unit that is configured to allow at least vertical partitioning of the systolic array. The matrix computation unit shown in FIG. 4 includes a two-dimensional systolic array 406 having multiple cells 304. In some implementations, a first dimension 320 of the systolic array 406 corresponds to columns of cells and a second dimension 322 of the systolic array 406 corresponds to rows of cells. The systolic array 406 can have more rows than columns, more columns than rows, or an equal number of columns and rows.

In the example illustrated in FIG. 4, value loaders 302 send activation inputs to rows of the array 406 and a weight fetcher interface 308 sends weight inputs to columns of the array 406. In some other implementations, however, activation inputs are transferred to the columns and weight inputs are transferred to the rows of the array 406.

The value loaders 302 may receive the activation inputs from a unified buffer, e.g., the unified buffer 208 of FIG. 2. The value loaders 302 may simultaneously send multiple activation inputs to a distinct left-most cell of the array 406. The left-most cell can be a cell along a left-most column of the array 406. For example, cell 314 may receive multiple activation inputs from a value loader 302. Similarly, cell 318 may receive multiple activation inputs from a value loader 302. The value loaders 302 may include arrays of activation inputs such that each cell coupled to a value loader simultaneously receives multiple activation inputs from multiple arrays, respectively. For example, cell 314 may receive a separate activation input from a first array 312a1, from a second array 312b1, and from a third array 312c1. Activation inputs may be sent from one or more of the value loader arrays (312a, 312b, 312c) to the left-most cells upon the occurrence of a clock cycle (e.g., based on the clock signal from the host interface 202). For instance, a first activation input from array 312a1, a first activation input from array 312b1, and a first activation input from array 312c1 may be sent to cell 314 upon a first clock cycle, whereas a second activation input from array 312a1, a second activation input from array 312b1, and a second activation input from array 312c1 may be sent to cell 314 upon a second clock cycle. The number of arrays 312 from which activation inputs are received by each cell may vary.

Figure 5:
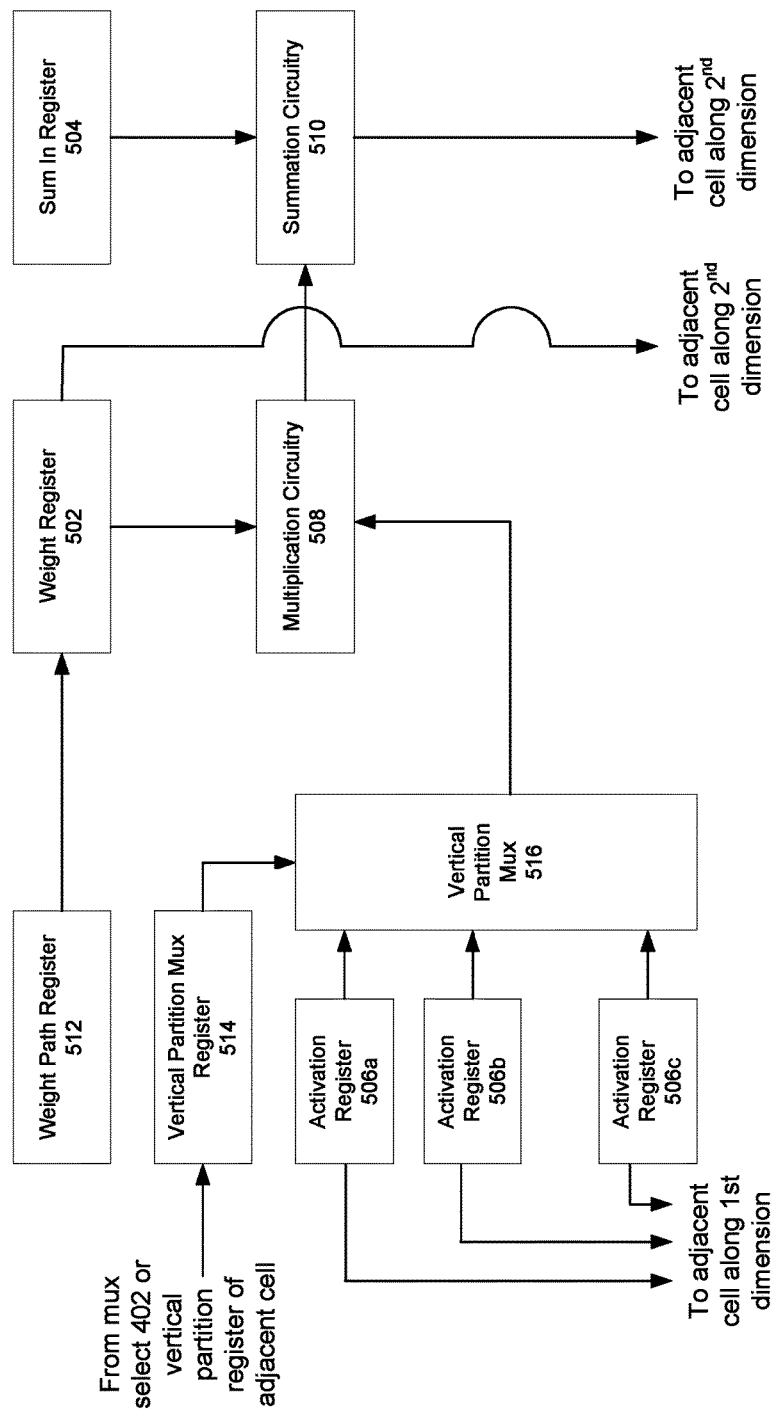
FIG. 5 shows an example architecture of a cell inside a systolic array.

Each activation input received by a cell may be stored in a corresponding activation register of the cell, such as activations registers 506a, 506b, 506c, described in more detail with respect to FIG. 5. The value loaders may also send the multiple activation inputs to an adjacent value loader, such that the multiple activation inputs can be used at another left-most cell of the array 406, such as cell 318. This allows activation inputs to be shifted for use in another particular cell of the array 406. For example, activation inputs from array 312a1 may be sent to array 312a2, activation inputs from array 312b1 may be sent to array 312b2, and activation inputs from array 312c1 may be sent to array 312c2. The shifting of activation inputs may be repeated up to the nth row of the array 406 (e.g., so that array 312cn receives an activation input from array 312c(n-1)).

The weight fetcher interface 308 may receive the weight inputs from a memory unit, e.g., the dynamic memory 210 of FIG. 2. The weight fetcher interface 308 may send multiple weight inputs to multiple top-most cells, respectively, of the array 406. A top-most cell may be a cell along a top-most row of the array 406. For example, the weight fetcher interface 308 may send a first weight input to cell 314 and a second weight input to cell 316.

In some implementations, a host interface, e.g., the host interface 202 of FIG. 2, shifts activation inputs throughout the array 406 along one dimension, e.g., to the right, while shifting weight inputs throughout the array 406 along another dimension, e.g., to the bottom. For example, over one clock cycle, the multiple activation inputs sent to cell 314 may be shifted to corresponding activation registers within cell 316, which is to the right of cell 314. Similarly, the weight input at cell 314 may be shifted to a corresponding weight register within cell 318, which is below cell 314. In some implementations, weights and activations are shifted more than one cell during a given clock cycle to transition from one convolution calculation to another.

On each clock cycle, each cell may process the received weight input and a selected one of the multiple received activation inputs to generate an accumulated output. The accumulated output may also be passed to an adjacent cell along the same dimension as the given weight input or may be passed to the sum registers 310.

In some implementations, the activation input is selected from the multiple activation inputs based on the value of a mux select register 402. A mux select register 402 may receive the mux select values from a memory unit. The mux select registers 402 may send multiple corresponding mux select values to a distinct top-most cell of the array 406. For example, the mux select register 402a may send a first mux select value to cell 314 and the mux select register 402b may send a second mux select value to cell 316. Each mux select value received by a cell may be stored in a corresponding partition register of the cell, such as vertical partition register 514, described in more detail with respect to FIG. 5.

In some implementations, a host interface, e.g., the host interface 202 of FIG. 2, shifts mux select values throughout the array 406 along one dimension, e.g., from the top to the bottom of the array 406. For example, over one clock cycle, the mux select value sent to cell 314 may be shifted to a corresponding partition register within cell 318, which is below cell 314.

The accumulated outputs can be passed along the same column as the weight inputs, e.g., towards the bottom of the column in the array 406. In some implementations, at the bottom of each column, the array 406 can include sum registers 310 that store the accumulated outputs from each column of cells. In some implementations, as discussed in more detail with respect to horizontal partitioning in FIG. 6, sum registers 310 store the accumulated outputs from less than all of the cells in a column. In some implementations, multiple sum registers 310 are provided for each column, so that each sum register can store values from different groups of cells within each column. For example, in some cases, a first sum register associated with a column stores an accumulated output from the first two rows of the column, a second sum register associated with the column stores an accumulated output from the next two rows of the column, and so forth. The accumulated outputs may be transferred to a vector computation unit from the sum registers. In some implementations, the accumulated values are transferred directly from the bottom cells of the array to the vector computation unit.

An individual cell configured to allow vertical partitioning is described further below with reference FIG. 5. FIG. 5 shows an example architecture 500 of a cell inside a systolic array, e.g., the systolic array 406 of FIG. 4.

The cell may include multiple activation registers (506a, 506b, 506c) that store activation inputs. The activation registers (506a, 506b, 506c) may receive the activation inputs from a left adjacent cell, i.e., an adjacent cell located to the left of the given cell, or from a unified buffer (e.g., from the value loader arrays 312a, 312b, 312c shown in FIG. 4), depending on the position of the cell within the systolic array. Though three activation registers are shown, the number of activation registers within a cell may vary. In some implementations, the number of activation registers to include within a cell may be determined by the maximum number of different simultaneous matrix computation operations to be performed. For instance, if only two simultaneous matrix computations will be performed, the cells may be configured to include only two activation registers. In some implementations, it may be useful to include a first number of activation registers in a first group of cells and a second, lesser number of activation registers in a second group of cells. For example, for a matrix computation unit having 10 columns of cells, each cell from the first 5 columns may include two activation registers, such that the cells of the first 5 columns may select activation inputs from one of two possible value loader arrays. The cells of the next 5 columns may include a single activation register, such that the activation inputs to those cells are fixed based on the values from a single value loader array. In cases where cells are not configured to perform vertical partitioning, the cells may be designed without a multiplexer. For that same reason, there is no need to couple a mux select register to the cells that are not configured to perform vertical partitioning.

The cell may include a weight register 502 that stores a weight input. The weight input may be transferred from a top adjacent cell or from a weight fetcher interface, depending on the position of the cell within the systolic array. The cell may also include a sum in register 504. The sum in register 504 may store an accumulated value from the top adjacent cell.

The cell may also include a vertical partition multiplexer 516. The vertical partition multiplexer 516 is communicatively coupled to the activation registers (506a, 506b, 506c) to receive the activation inputs from the activation registers. The multiplexer 516 is configured to select one of the activation inputs and provide the selected activation input to multiplication circuitry 508. The cell may also include a vertical partition mux register 514. The vertical partition mux register 514 may store a mux select value from the vertical partition register of a top adjacent cell or from the mux select register 402, depending on the position of the cell within the systolic array. The mux select value stored in the register 514 is sent to the multiplexer 516, e.g., upon the occurrence of a clock cycle. Based on the mux select value received at multiplexer 516, the multiplexer 516 determines which activation input is selected. For example, a mux select value of 0 may result in selection of an activation input from register 506a, a mux select value of 1 may result in selection of an activation input from register 506b, and a mux select value of 2 may result in selection of an activation input from register 506c. The mux select value stored in the vertical partition mux register 514 may be transferred to a vertical partition mux register in a bottom adjacent cell.

Multiplication circuitry 508 may be used to multiply the weight input from the weight register 502 with the selected activation input from the activation register 506. The multiplication circuitry 508 may output the product to summation circuitry 510. The summation circuitry can sum the product and the accumulated value from the sum in register 504 to generate a new accumulated value. The summation circuitry 510 may then send the new accumulated value to another sum in register located in a bottom adjacent cell. The new accumulated value may be used as an operand for a summation in the bottom adjacent cell. Alternatively, the summation circuitry 510 may send the new accumulated value to a sum register, such as sum register 310 shown in FIG. 4, depending on the location of the cell in the array 406.

The cell may also shift the weight input and the activation inputs to adjacent cells for processing. For example, the weight register 502 may send the weight input to another weight register in the bottom adjacent cell. The activation registers (506a, 506b, 506c) may send the activation inputs to another set of activation registers, respectively, in the right adjacent cell. Both the weight input and the activation input may therefore be reused by other cells in the array at a subsequent clock cycle.

In some implementations, the cell also includes a control register. The control register may store a control signal that determines whether the cell should shift either the weight input, the activation inputs, and/or the mux select value to adjacent cells. In some implementations, shifting the weight input, the activation inputs, and/or the mux select values takes one or more clock cycles. The control signal may also determine whether the activation input or weight inputs are transferred to the multiplication circuitry 508, or may determine whether the multiplication circuitry 508 operates on the activation and weight inputs. The control signal may also be passed to one or more adjacent cells, e.g., using a wire.

In some implementations, weights are pre-shifted into a weight path register 512. The weight path register 512 may receive the weight input, e.g., from a top adjacent cell, and transfer the weight input to the weight register 502 based on the control signal. The weight register 502 may statically store the weight input such that as activation inputs are transferred to the cell, e.g., through the activation registers 506a, 506b, 506c, over multiple clock cycles, the weight input remains within the cell and is not transferred to an adjacent cell. Therefore, the weight input may be applied to multiple sets of activation inputs, e.g., using the multiplication circuitry 508, and respective accumulated values can be transferred to an adjacent cell.

Figure 6:
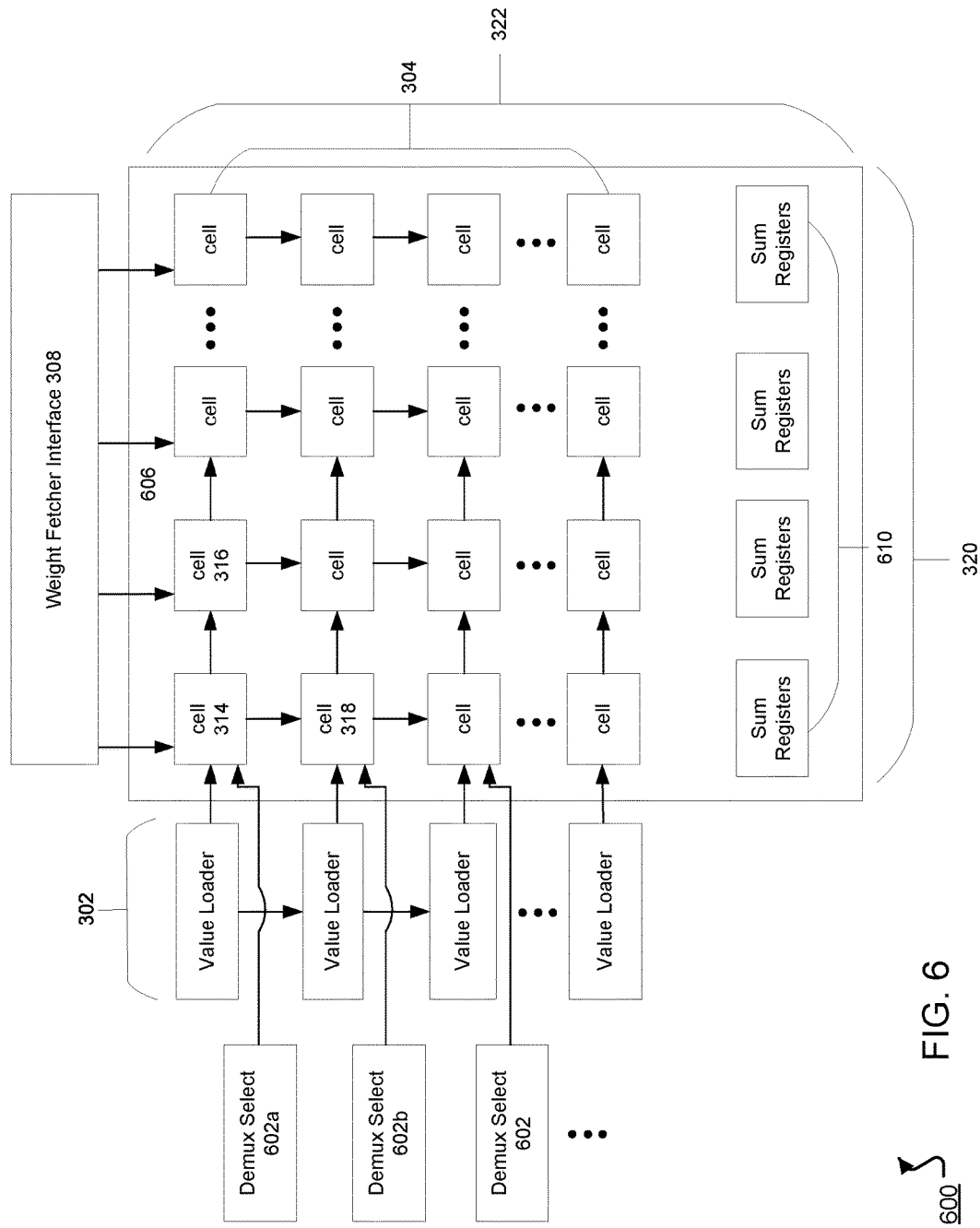
FIG. 6 shows an example architecture including a matrix computation unit.

FIG. 6 shows an example architecture 600 including a matrix computation unit that is configured to allow at least horizontal partitioning of the systolic array. Certain operations and components of architecture 600 function in a like manner as the identically numbered operations and components of architecture 400 and will not be repeated here. Similar to the architectures shown in FIGS. 3 and 4, the matrix computation unit shown in FIG. 6 includes a two-dimensional systolic array 606 having multiple cells 304. In some implementations, a first dimension 320 of the systolic array 606 corresponds to columns of cells and a second dimension 322 of the systolic array 606 corresponds to rows of cells. The systolic array 606 can have more rows than columns, more columns than rows, or an equal number of columns and rows.

In the example illustrated in FIG. 6, value loaders 302 may send one or more activation inputs (e.g., from one or more arrays) to a distinct left-most cell of the array 606. Each activation input received by a cell may be stored in a corresponding activation register of the cell. The value loaders may also send the one or more activation inputs to an adjacent value loader, such that the one or more activation inputs can be used at another left-most cell of the array 606, such as cell 318. This allows activation inputs to be shifted for use in another particular cell of the array 606.

The weight fetcher interface 308 may receive the weight inputs from a memory unit, e.g., the dynamic memory 210 of FIG. 2. The weight fetcher interface 308 may send weight inputs to top-most cells, respectively, of the array 606. In some implementations, a host interface, e.g., the host interface 202 of FIG. 2, shifts activation inputs throughout the array 606 along one dimension, e.g., to the right, while shifting weight inputs throughout the array 606 along another dimension, e.g., to the bottom.

On each clock cycle, each cell may process the received weight input and the received activation inputs to generate an accumulated output. To allow for horizontal partitioning of the array 606, one or more of the cells are configured such that the accumulated output either may be passed to an adjacent cell along the same dimension as the given weight input or may be passed to a sum register 610 or to a vector computation unit. For instance, cell 314 is configured so that an accumulated output calculated by cell 314 is passed to cell 318 or is passed to one of the sum registers 610. Whether a cell in the systolic array passes the accumulated output to a next adjacent cell or to a sum register 610 may be determined by a value of a demultiplexer ("demux") select signal received by the cell. For example, if the demultiplexer select signal sent to a cell has a value of 1, the cell may send the accumulated output to one of the sum registers 610, whereas if the demultiplexer select signal sent to the cell has a value of 0, the cell may send the accumulated output to a next adjacent cell. Other values may be used for the demultiplexer select signals instead.

The demultiplexer select signal may be provided to a cell from a demux select register 602. The demultiplexer select registers 602 may receive the demux select values from a memory unit. Each demux select register 602 may send a corresponding demux select value to a distinct cell of the array 606. For example, the demux select register 602a may send a first demux select value to cell 314 and the demux select register 602b may send a second demux select value to cell 318. Each demux select value received by a cell may be stored in a corresponding partition register of the cell, such as horizontal partition register 714, described in more detail with respect to FIG. 7. Though FIG. 6 shows the demux select registers 602 communicatively coupled only to the left-most cells of the array 606, demux select registers may be communicatively coupled to other cells as well. In some implementations, less than all of the cells are communicatively coupled to a demux select register. For example, in some implementations, a demux select register is not provided for the cells in the bottom-most row of the array 606. This is because there are no additional cells to which the cells in the bottom-most row may pass their accumulated output. Additionally, in some implementations, it may not be necessary to couple a demux select register to certain cells because the minimum size of matrices to be used in matrix computations is known in advance. That is to say, the number of demux select registers to be provided and coupled to cells can be set based on a predetermined size of the matrices to be used in the matrix computation unit. For example, if it is known in advance that the matrices to be provided to the matrix computation unit all have 3 rows, the architecture 600 can be arranged such that only each third row of cells (e.g., the third row of cells, the sixth row of cells, the ninth row of cells, etc.) is configured to perform horizontal partitioning, with the cells of each third row being communicatively coupled to respective demux select registers 602. The remaining rows of cells will not be coupled to a demux select register and only pass their accumulated outputs to the corresponding cell in the next row. Cells that are not configured to perform horizontal partitioning can be designed without a demultiplexer. For that same reason, demux select registers do not need to be coupled to the cells that are not configured for horizontal partitioning.

As explained herein, sum registers 610 store the accumulated outputs from the cells in a column. However, if a column of cells has been subject to horizontal partitioning, a sum register 610 may store accumulated outputs from less than all of the cells in a column. For example, for a column of cells that has been partitioned into two separate sub-units (e.g., a top sub-unit and a bottom sub-unit), each of which can perform matrix computations simultaneously and independently, a first sum register may receive the accumulated output from the top sub-unit, whereas a second sum register may receive the accumulated output from the bottom sub-unit. Accordingly, in some implementations, multiple sum registers 610 are provided for each column of cells, so that each sum register can store values from different sub-units of cells within each column resulting from horizontal partitioning. Thus, although FIG. 6 shows a single sum register 610 associated with each column of cells, additional sum registers may be provided for each column. The accumulated outputs stored in the sum registers 610 may be transferred to a vector computation unit. In some implementations, the final accumulated values are transferred directly from the bottom cells of a sub-unit created by horizontal partitioning to the vector computation unit instead of to a sum register.

An individual cell configured to allow horizontal partitioning is described further below with reference FIG. 7.

Figure 7:
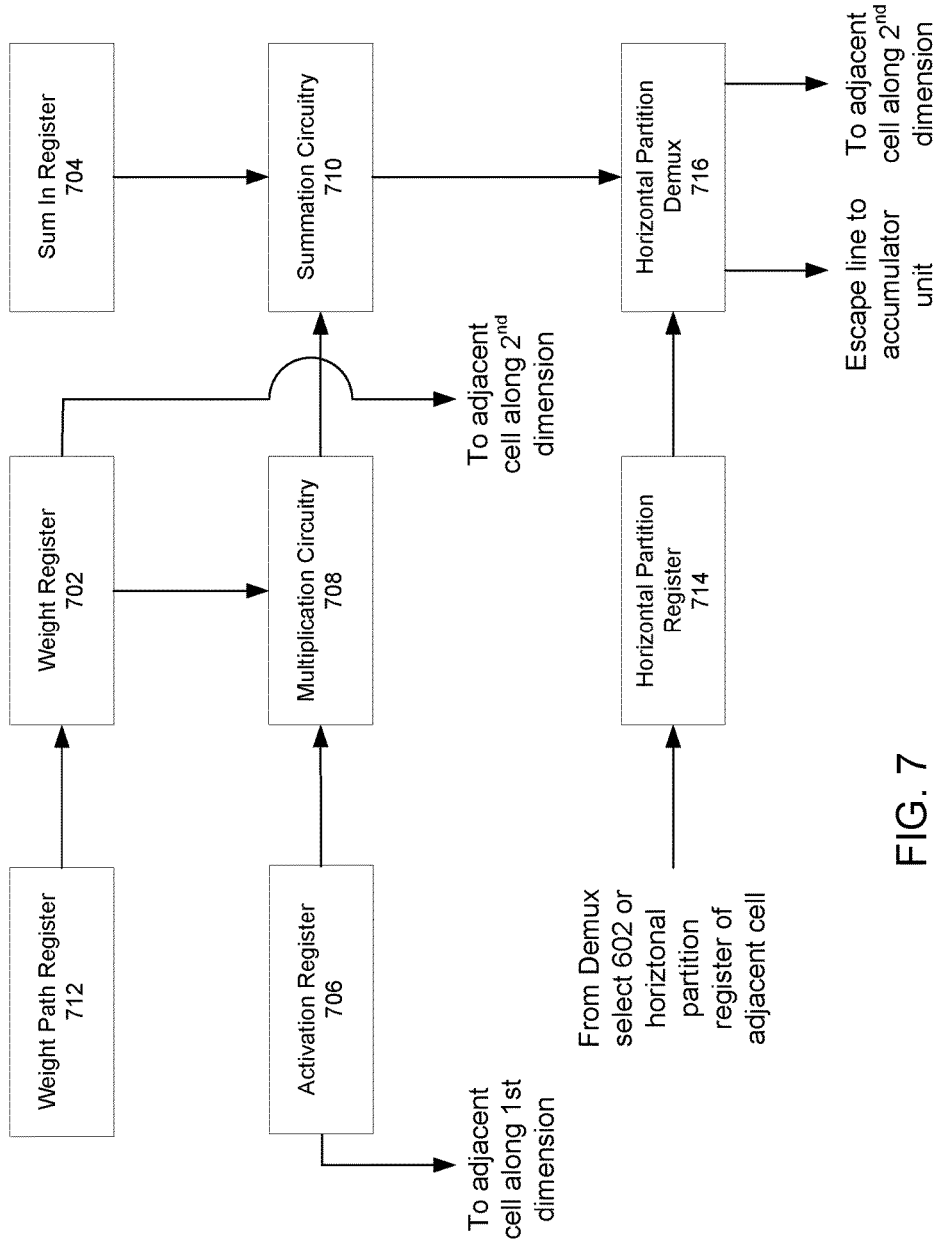
FIG. 7 shows an example architecture of a cell inside a systolic array.

FIG. 7 shows an example architecture 700 of a cell inside a systolic array, e.g., the systolic array 606 of FIG. 6. The cell may include an activation register 706 that stores an activation input. The activation register 706 may receive the activation inputs from a left adjacent cell, i.e., an adjacent cell located to the left of the given cell, or from a unified buffer (e.g., from the value loader 302 shown in FIG. 6), depending on the position of the cell within the systolic array. The cell may include a weight register 702 that stores a weight input. The weight input may be transferred from a top adjacent cell or from a weight fetcher interface, depending on the position of the cell within the systolic array. Similar to the cell architecture 500, weights may be pre-shifted into a weight path register 712. The weight path register 712 may receive the weight input, e.g., from a top adjacent cell, and transfer the weight input to the weight register 702 based on the control signal. The weight register 702 may statically store the weight input such that as activation inputs are transferred to the cell, e.g., through the activation register 706, over multiple clock cycles, the weight input remains within the cell and is not transferred to an adjacent cell.

The cell may also include a sum in register 704. The sum in register 704 may store an accumulated value from a top adjacent cell.

The cell may include multiplication circuitry 708 to multiply the weight input from the weight register 702 with the selected activation input from the activation register 706. The multiplication circuitry 708 may output the product to summation circuitry 710. The summation circuitry can sum the product and the accumulated value from the sum-in register 704 to generate a new accumulated value.

The cell may also include a horizontal partition demultiplexer 716. The horizontal partition demultiplexer 716 is communicatively coupled to the summation circuitry 710 to receive the new accumulated value from the summation circuitry 710. The demultiplexer 716 is configured to send the new accumulated value to another sum-in register located in a bottom adjacent cell. The new accumulated value may be used as an operand for a summation in the bottom adjacent cell. Alternatively, the demultiplexer 716 may send the new accumulated value to an escape line. The escape line can be coupled to a sum register or to a vector computation unit. The escape line may include, e.g., a wire. Whether the demultiplexer 716 sends the new accumulated value to the escape line or to a bottom adjacent cell depends on the value of a demux select signal received by the demultiplexer 716. For example, if the demux select signal received by demultiplexer 716 has a value of 1, the new accumulated output may be sent by the demultiplexer 716 to the escape line, whereas if the demux select signal has a value of 0, the accumulated output may be sent to a next adjacent cell.

The cell may include a horizontal partition register 714 for storing the demux select signal, in which the register 714 is communicatively coupled to the demultiplexer 716. The horizontal partition register 714 may receive the demux select signal from a demux select register, such as register 602 shown in FIG. 6. The demux select value stored in the register 714 may be sent to the multiplexer 716, e.g., upon the occurrence of a clock cycle.

In some implementations, the cell also includes a control register. The control register may store a control signal that determines whether the cell should shift the weight input, the activation inputs, and/or the mux select value to adjacent cells. In some implementations, shifting the weight input, the activation inputs, and/or the mux select values takes one or more clock cycles. The control signal may also determine whether the activation input or weight inputs are transferred to the multiplication circuitry 708, or may determine whether the multiplication circuitry 708 operates on the activation and weight inputs. The control signal may also be passed to one or more adjacent cells, e.g., using a wire.

Figure 8:
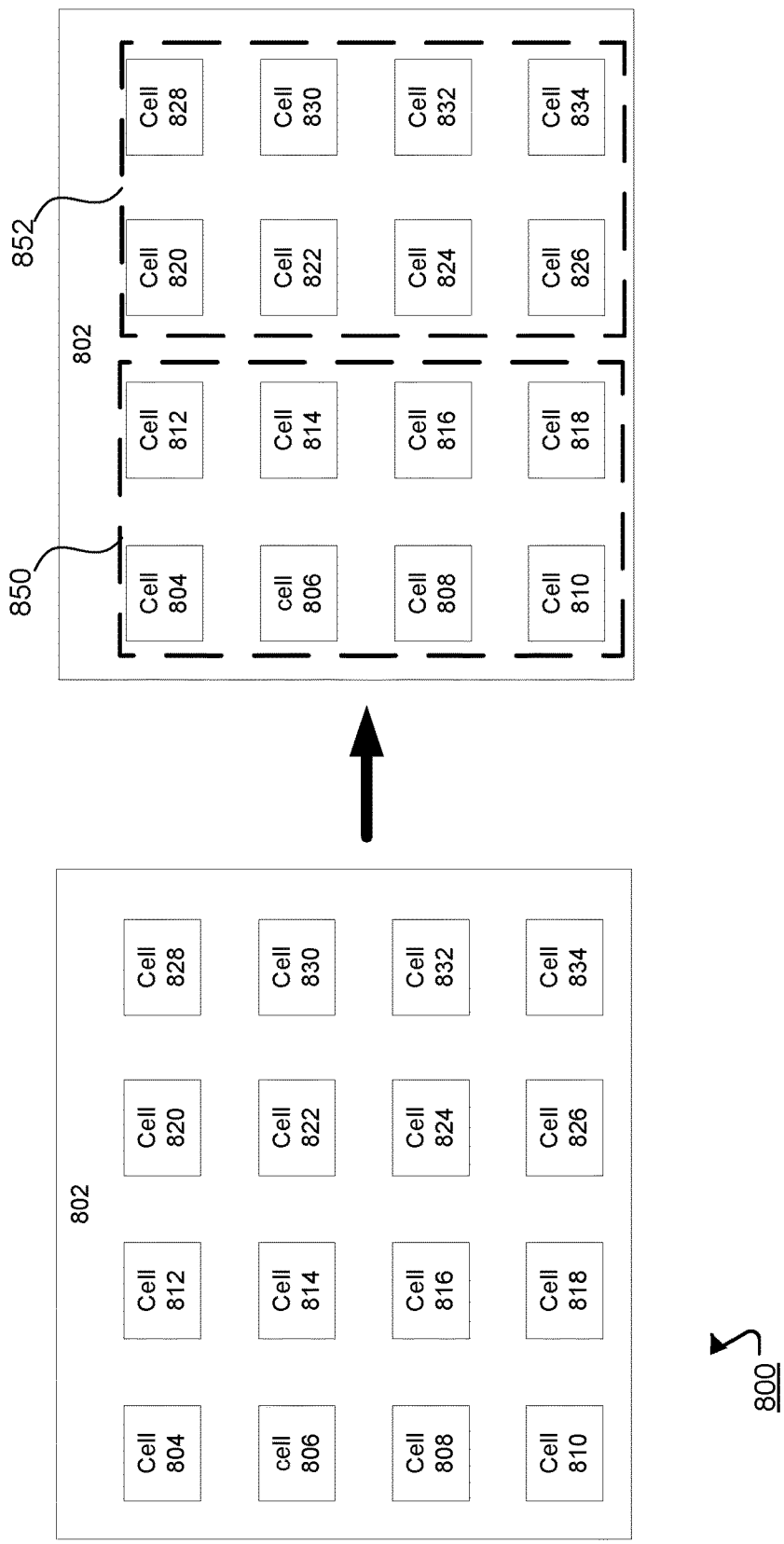
FIGS. 8-10 show examples of partitioning a matrix computation unit.
Figure 9:
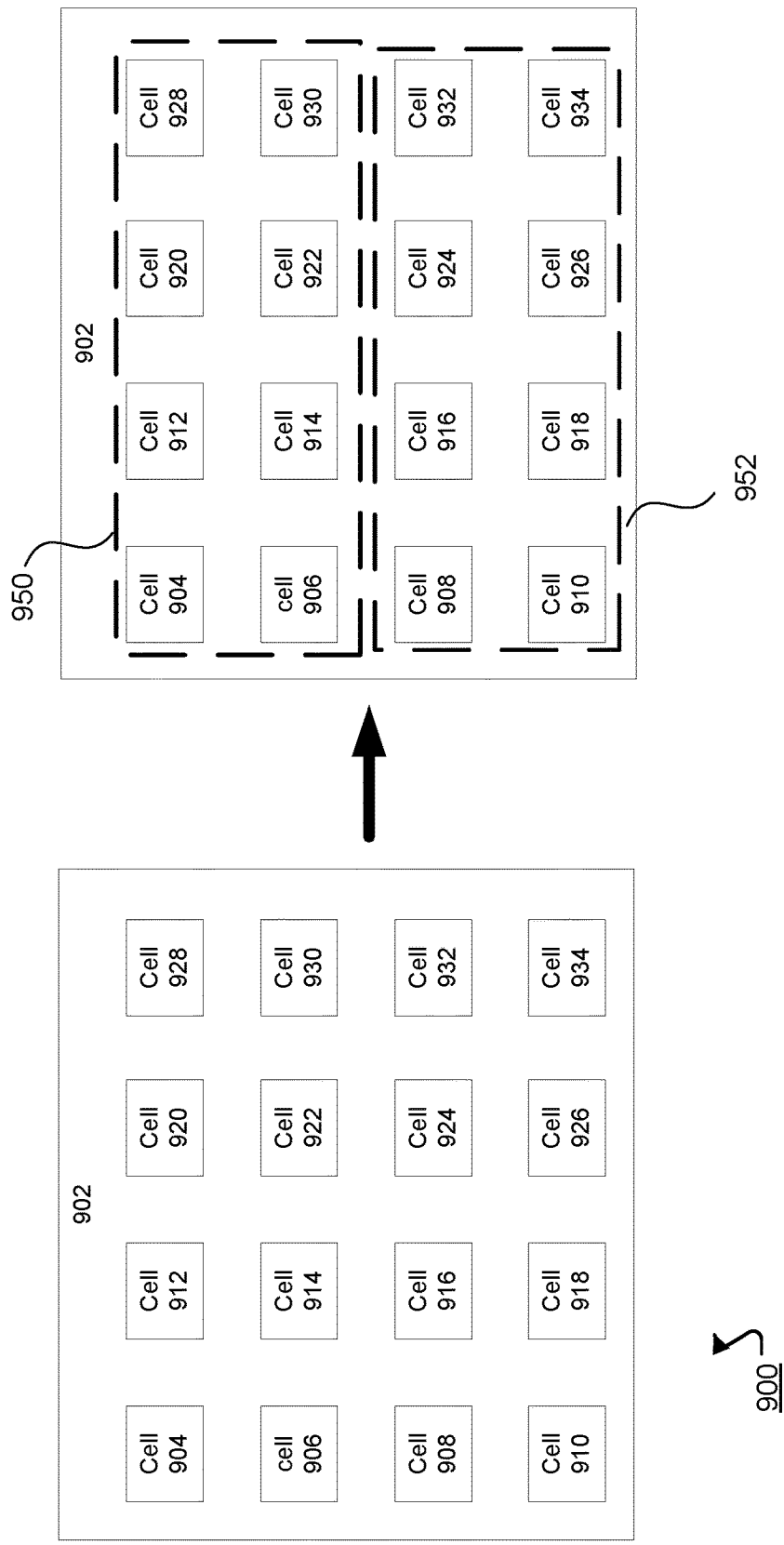
Figure 10:
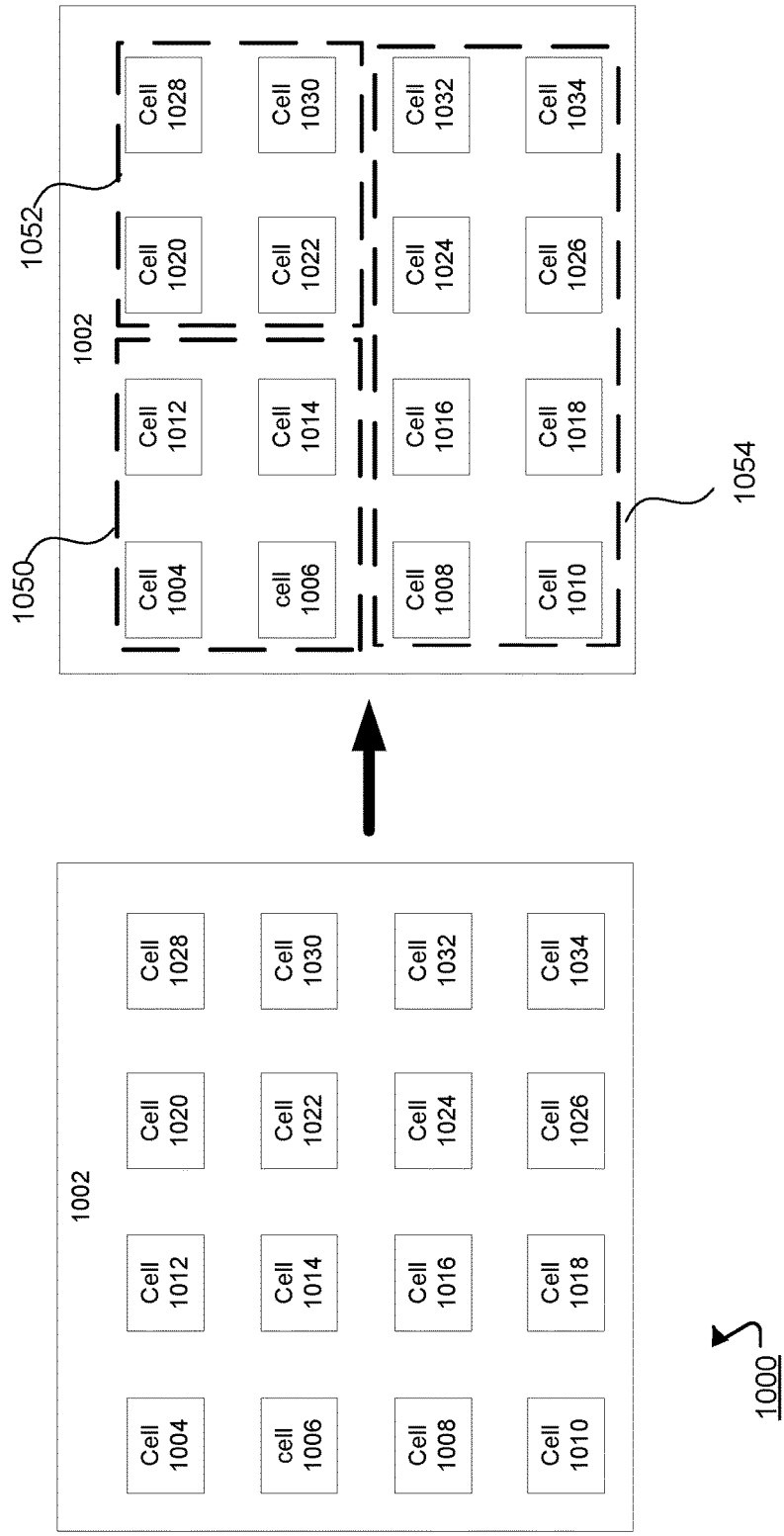

FIGS. 8-10 are schematics that illustrate examples of partitioning a systolic array using vertical partitioning, horizontal partitioning, or a combination of both vertical partitioning and horizontal partitioning. FIG. 8 illustrates an example of an architecture 800 configured to allow dynamic vertical partitioning of a systolic array 802 of cells. The architecture 800 is configured as described herein with respect to FIG. 4. For ease of viewing, value loaders, sum registers, mux select registers, and the weight fetcher interface are not illustrated. Array 802 includes 16 cells arranged in 4 rows by 4 columns. Each cell may be configured similar to the cell architecture shown in FIG. 5. That is, each cell may include multiple (e.g., two) activation registers that are communicatively coupled to a multiplexer, which, in turn is coupled to multiplication circuitry. The cells may also include a vertical partition mux register that is communicatively coupled to the vertical partition multiplexer. In an example implementation, the left two columns of cells (cells 804-818) receive a first mux select value (e.g., a "0") from corresponding mux select registers. The right two columns of cells (cells 820-834), in contrast, receive a second different mux select value (e.g., a "1"). Based on the mux select values received by each cell, the multiplexer within the cell will select a particular activation input to use for the multiplication operation. Thus, since the first two columns of cells receive the same mux select value, those cells will all use the same activation input for the multiplication operation. Since the last two columns of cells all receive a mux select value that is different from the first two columns, the last two columns of cells will select a different activation input for the multiplication operation. The selection of different activation inputs for the different columns thus results in the operation of two unique sub-units/partitions 850 and 852.

FIG. 9 illustrates an example of an architecture 900 configured to allow dynamic vertical partitioning of a systolic array 902 of cells. The architecture 900 is configured as described herein with respect to FIG. 6. For ease of viewing, value loaders, sum registers, demux select registers, and the weight fetcher interface are not illustrated. Array 902 includes 16 cells arranged in 4 rows by 4 columns. Certain cells within the array 902 may be configured similar to the cell architecture shown in FIG. 7. For example, each cell within the second row of cells (cells 906, 914, 922, and 930) may include a demultiplexer communicatively coupled to the output of summation circuitry. Each cell within the second row of cells (cells 906, 914, 922, and 930) may also include a horizontal partition mux register that is communicatively coupled to the demultiplexer. Each horizontal partition register of each cell within the second row may also be communicatively coupled to a corresponding demux select register. In an example implementation, the second row of cells receive a first demux select value (e.g., a "0") from corresponding demux select registers. Based on the demux select values received by each cell in the second row, the demultiplexer within the cells will send the accumulation output calculated in those cells to an escape line, rather than to the adjacent cells (i.e., cells 908, 916, 924, and 932) located beneath the second row. The accumulated values on the escape line may be sent to sum registers or to a vector computation unit. In contrast, the cells in the first row (cells 904, 912, 920, and 928) and the cells in the third row (cells 908, 916, 924, and 932) will send their accumulated outputs to the adjacent cells that are located directly beneath them. Additionally, the cells in the last row (cells 910, 918, 926, and 934) will send their accumulated outputs to sum registers or to a vector computation unit. In this way, the accumulation outputs calculated by cells in the third and fourth row are effectively isolated from the accumulation outputs calculated in the top two rows, resulting in the formation of two sub-units/partitions of the matrix computation unit.

FIG. 10 illustrates an example of an architecture 1000 configured to allow both dynamic vertical and dynamic horizontal partitioning of a systolic array 1002 of cells. The architecture 1000 is configured as described herein with respect to both FIGS. 4 and 6. For ease of viewing, value loaders, sum registers, demux select registers, mux select registers, and the weight fetcher interface are not illustrated. Array 1002 includes 16 cells arranged in 4 rows by 4 columns. Certain cells within the array 1002 may include an architecture configured in the same manner as described with respect to FIGS. 5 and 8. For example, each cell of the top two rows of cells (cells 1004, 1006, 1012, 1014, 1020, 1022, 1028, and 1030) may include multiple (e.g., two) activation registers that are communicatively coupled to a multiplexer, which, in turn is coupled to multiplication circuitry. Each cell within the top two rows of cells may also include a vertical partition mux register that is communicatively coupled to the vertical partition multiplexer and is configured to receive a mux select value from a corresponding mux select register coupled to the cell. In some implementations, only the left-most cells (e.g., cells 1004 and 1006) are coupled to corresponding mux select registers, whereas each cell within the second and third column of the top two rows of cells (e.g., cells 1012, 1014, 1020, 1022) are configured to receive a mux select value from an adjacent cell to the left and pass a mux select value to an adjacent cell to the right. The bottom two rows of cells may not be configured for vertical partitioning. That is, each cell within the bottom two rows of cells may have a single activation input register coupled to the multiplication circuitry.

Additionally, the second row of cells (cells 1006, 1014, 1022, and 1030) may include an architecture configured in the same manner as described with respect to FIGS. 6 and 9. For example, the second row of cells may include a demultiplexer communicatively coupled to the output of summation circuitry. Each cell within the second row of cells may also include a horizontal partition demux register that is communicatively coupled to the demultiplexer. Each horizontal partition register of each cell within the second row may also be communicatively coupled to a corresponding demux select register. The remaining cells may not be configured for horizontal partitioning. For example, the remaining cells may be configured so that the accumulated output calculated by those cells is sent directly to a sum-in register in an adjacent cell or to a sum register depending on the location of the cell within the array 1002.

In an example implementation, the top left quadrant of cells (cells 1004, 1006, 1012, and 1014) receive a first mux select value (e.g., a "0") from corresponding mux select registers. The top right quadrant of cells (cells 1020, 1022, 1028, and 1030), in contrast, receive a second different mux select value (e.g., a "1"). Based on the mux select values received by each cell, the multiplexer within the cell will select a particular activation input to use for the multiplication operation. Thus, since the top left quadrant of cells receive the same mux select value, those cells will all use the same activation input for the multiplication operation. Similarly, since the top right quadrant of cells receive the same mux select value, those cells will all use the same activation input (but different from the activation input used by the top left quadrant of cells) for the multiplication operation. Since the last two columns of cells are not configured for vertical partitioning, those cells do not receive a mux select value.

Additionally, the second row of cells receive a first demux select value (e.g., a "0") from corresponding demux select registers. Based on the demux select values received by each cell in the second row, the demultiplexer within the cells will send the accumulation output calculated in those cells to an escape line, rather than to the adjacent cells (i.e., cells 1008, 1016, 1024, and 1032) located beneath the second row. The accumulated values on the escape line may be sent to sum registers or to a vector computation unit. In contrast, the cells in the first row (cells 1004, 1012, 1020, and 1028) and the cells in the third row (cells 1008, 1016, 1024, and 1032) will send their accumulated outputs to the adjacent cells that are located directly beneath them. Additionally, the cells in the last row (cells 1010, 1018, 1026, and 1034) will send their accumulated outputs to sum registers or to a vector computation unit. In this way, the combination of vertical and horizontal partitioning results in the formation of three sub-units/partitions of the matrix computation unit that provide independent outputs and operate simultaneously.

Figure 11:
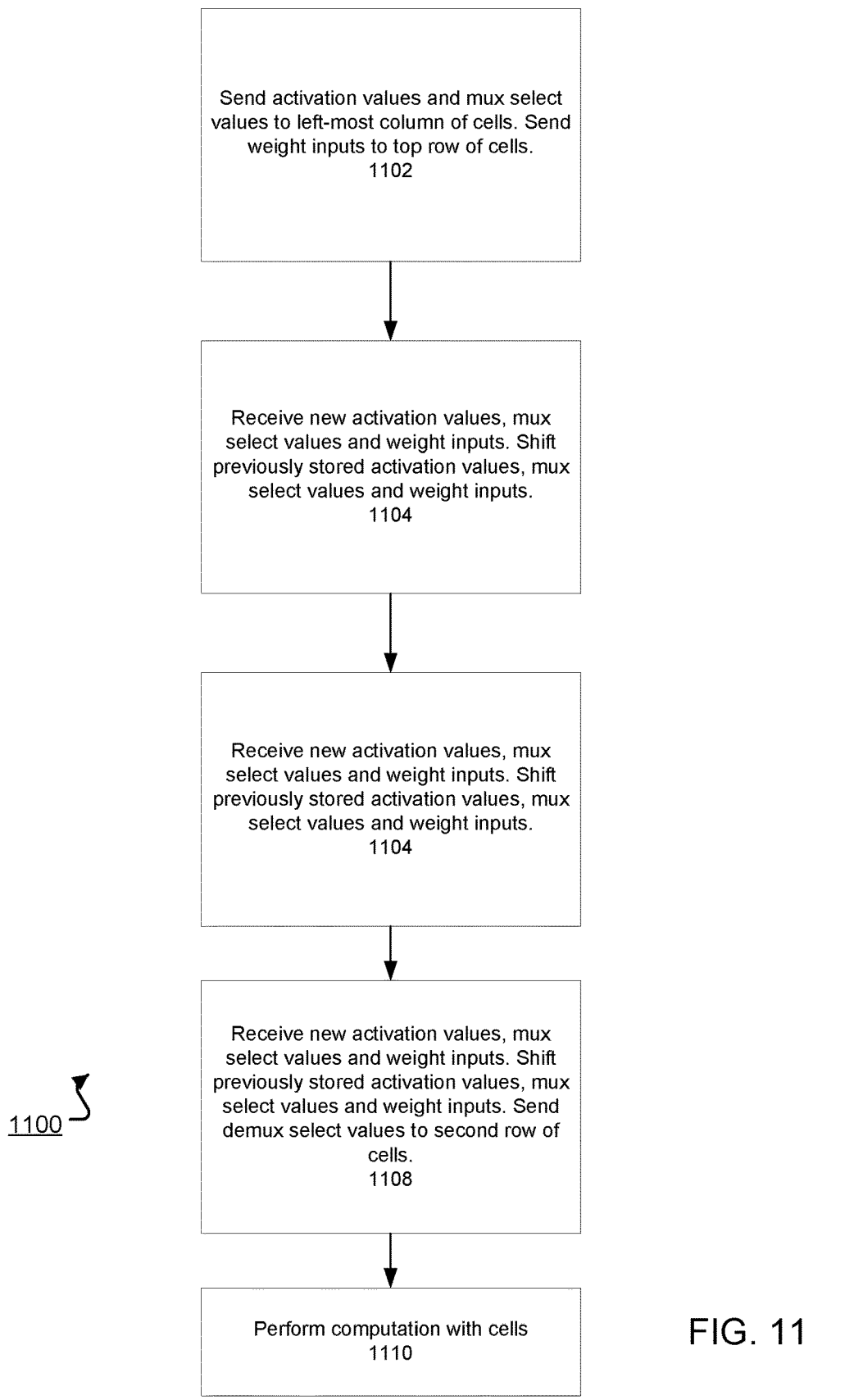
FIG. 11 is a flow chart that illustrates an example process for reconfiguring a matrix multiplication unit based on dynamic partitioning.

FIG. 11 is a flow chart that illustrates an example process 1100 for reconfiguring a matrix multiplication unit, such as the matrix multiplication unit illustrated in FIG. 10, based on vertical and/or horizontal partitioning. For the example process, the left-most cells (cells 1004 and 1006) of the first two rows are coupled to corresponding mux select registers, whereas cells 1012, 1014, 1020, 1022 are configured to receive mux select values from respective adjacent cells to the left and pass mux select values to respective adjacent cells to the right. Each of the last two cells (cells 1028 and 1030) of the first two rows is configured to receive mux select values from an adjacent cell to the left.

Initially, the matrix multiplication unit may be understood to be in a state as illustrated by 1000 in FIG. 10. That is, the 16 cells have not been partitioned and function together as a single matrix multiplication unit. In the example process depicted in FIG. 11, the activation values and weight inputs are fully propagated throughout the cells of the array, and the mux select and demux select values are provided to cells requiring such inputs, before a computation is performed. For example, in a first step (1102) upon the occurrence of a first clock cycle, activation values are sent from value loaders to the left-most cells (cells 1004, 1006, 1008, 1010) of the array. Because cells 1004 and 1006 are configured for vertical partitioning (i.e., the cells include two different activation registers), each of those cells is coupled to two different corresponding activation input arrays within a value loader. Each of cells 1008 and 1010, however, is coupled to a single array within a value loader. Weight inputs are also provided to the top most row of cells (e.g., cells 1004, 1012, 1020, 1028) from a weight fetcher interface. Additionally, in the first step (1102) mux select values are provided. For instance, cells 1004 and 1006, which are configured for vertical partitioning, may receive a mux select value from respective mux select registers.

In a second step (1104), which may proceed upon the occurrence of a second clock cycle, the matrix multiplication unit may cycle in new activation inputs into the first column of cells. Similarly, new mux select values may sent to the left-most cells of the top two rows. The previous activation inputs and mux select values stored in the cells of the first column may then be sent to cells in the second column. New weight inputs are cycled into the first row of cells, whereas the weight input values stored in the cells of the first row are sent to respective cells in the second row.

In a third step (1106), which may proceed upon the occurrence of a third clock cycle, the matrix multiplication unit may again cycle in new activation inputs into the first column of cells. Similarly, new mux select values may be sent to the left-most cells of the top two rows. The previous activation inputs and mux select values stored in the cells 1004 and 1006 may be sent to cells 1012 and 1014, respectively. And the previous activation inputs and mux select values stored in the cells 1012 and 1014 may be sent to cells 1020 and 1022, respectively. New weight inputs are cycled into the first row of cells, whereas the weight input values stored in the cells of the first row are sent to respective cells in the second row and the weight inputs values stored in the second row of cells are sent to respective cells in the third row.

In a fourth step (1108), which may proceed upon the occurrence of a fourth clock cycle, the matrix multiplication unit may again cycle in new activation inputs and mux select values into the left-most cells of the top two rows. The previous activation inputs and mux select values stored in the cells 1004 and 1006 may be sent to cells 1012 and 1014, respectively. The previous activation inputs and mux select values stored in the cells 1012 and 1014 may be sent to cells 1020 and 1022, respectively. And the previous activation inputs and mux select values stored in cells 1020 and 1022 may be sent to cells 1028 and 1030, respectively. New weight inputs are cycled into the first row of cells, whereas the weight input values stored in the cells of the first row are sent to respective cells in the second row, the weight inputs values stored in the second row of cells are sent to respective cells in the third row, and the weight inputs values stored in the third row of cells are sent to respective cells in the fourth row.

In the fourth step (1108), demux select values also may be provided to the cells configured for horizontal partitioning. That is, cells 1006, 1014, 1022, and 1030, receive demux select values from respective demux select registers to which those cells are coupled. Since no other cells are coupled to demux select registers, no other cells would receive demux select values. Though demux select values are provided to the cells in this example in the fourth step, the demux select values may be provided at any earlier step and stored in the cell.

Depending on the values of the mux select and demux select parameters stored in the cells, the matrix computation unit may be reconfigured into multiple independent sub-units, such as depicted in FIG. 10. With the activation values and weight inputs also having been fully propagated through the cells, the new matrix computation sub-units may, in a fifth step (1110), perform computations on the stored activation values and weight inputs upon the occurrence of one or more additional clock cycles. The outputs of the cell computations may be sent to sum registers, a vector computation unit, or adjacent cells depending on the configuration and/or location of the cells within the array.

Though the example process described with respect to FIG. 11 requires that the activation values and weight inputs be fully propagated throughout the array before the cell computations are performed, the cells may perform computations before all values are fully propagated. For example, in step 1102 above, when the first activation values, weight input, and mux select value are provided to cell 1004, cell 1004 may perform an initial computation based on the selected activation value (as determined by the mux select value) and a weight input received from a weight fetcher interface. The accumulated output of the computation along with the stored weight input from cell 1004 may be passed to cell 1006, whereas the activation values and mux select value may be passed to cell 1012. In a next step, cell 1006 then may use the accumulated output along with a new activation value it selects (based on a received mux value), the received weight input, and any received demux select value to perform a new calculation. At the same time, cell 1012 may use the mux select value and activation values received from cell 1004, as well as a weight input received from a weight fetcher interface to perform a new calculation within cell 1004. Other cells within the array may function in a similar manner.

Although the system has been described with weight inputs being sent to columns of the array and activation inputs being sent to rows of the array, in some implementations, the weight inputs are sent to rows of the array and the activation inputs are sent to columns of the array.

Furthermore, although the matrix computation units have been described herein as using individual cells, polycells may be used instead. Polycells may include groups of multiple cells, where the group of cells are coupled to the activation registers, instead of each cell including their own unique activation register (or registers). By coupling the activation registers to groups of cells, it is possible, in some implementations to increase the frequency at which the cells are updated with new activation inputs. The group of cells within each polycell also may be coupled directly to a single summation circuit, which sums the received outputs, from the cells, thus reducing the number of sum-in registers required to store the outputs.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or functionally-pure or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To send for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to send for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A matrix computation unit comprising a systolic array of cells arranged along a first and second dimension, wherein the systolic array of cells comprises a first plurality of cells, each cell of the first plurality of cells comprising:
   a weight register configured to store a weight input;
   a plurality of activation registers, each activation register of the plurality of activation registers configured to store a corresponding activation input;
   multiplexer circuitry communicatively coupled to the plurality of activation registers and configured to select, from the plurality of activation registers, one of the activation inputs as a selected activation input; and
   multiplication circuitry communicatively coupled to the weight register and to the multiplexer, wherein the multiplication circuitry is configured to output a product of the weight input and the selected activation input,
   wherein the matrix computation unit further comprises a first value loader communicatively coupled to a first cell of the first plurality of cells, wherein the first value loader is configured to provide a plurality of activation inputs to the plurality of activation registers within the first cell, respectively, and
   wherein the first cell is configured to pass the plurality of activation inputs to a next adjacent cell of the first plurality of cells.

2. The matrix computation unit of claim 1, wherein each cell of the first plurality of cells comprises a vertical partition register communicatively coupled to the multiplexer circuitry and configured to store a multiplexer control signal.

3. The matrix computation unit of claim 2, comprising a first mux select register communicatively coupled to a first cell of the first plurality of cells, the first mux select register being configured to provide a first multiplexer control signal to a first vertical partition register of the first cell.

4. The matrix computation unit of claim 3, wherein the first cell is configured to pass the first multiplexer control signal to a next adjacent cell of the first plurality of cells.

5. The matrix computation unit of claim 1, wherein the first value loader is configured to simultaneously provide the plurality of activation inputs to the plurality of activation registers within the first cell, respectively.

6. A matrix computation unit comprising a systolic array of cells arranged along a first and second dimension, wherein the systolic array of cells comprises a first plurality of cells, each cell of the first plurality of cells comprising:
   a weight register configured to store a weight input;
   multiplication circuitry communicatively coupled to the weight register, wherein the multiplication circuitry is configured to output a product of the weight input and an activation input;
   a sum-in register configured to store a previously summed value;
   summation circuity communicatively coupled to the multiplication circuitry and to the sum-in register, wherein the summation circuitry is configured to output a sum of the product and the previously summed value;
   demultiplexer circuitry communicatively coupled to the summation circuitry, wherein the demultiplexer circuitry is configured to send the sum from the summation circuitry to another sum-in register in a second adjacent cell of the systolic array of cells along the second dimension or send the sum to an escape line depending on a value of a demultiplexer control signal received by the demultiplexer.

7. The matrix computation unit of claim 6, wherein each cell of the first plurality of cells comprises a horizontal partition register communicatively coupled to the demultiplexer circuitry, wherein the horizontal partition register is configured to store a demultiplexer control signal and to send the stored demultiplexer control signal to the demultiplexer.

8. The matrix computation unit of claim 7, comprising a first demux select register communicatively coupled to a first cell of the first plurality of cells, the first demux select register being configured to provide the first demultiplexer control signal to a first horizontal partition register of the first cell.

9. The matrix computation unit of claim 6, comprising a plurality of sum registers, wherein each escape line of the first plurality of cells is communicatively coupled to a different corresponding sum register of the plurality of sum registers.

10. The matrix computation unit of claim 6, wherein each escape line of the first plurality of cells is communicatively coupled to a vector computation unit.

11. The matrix computation unit of claim 1, wherein each cell of the first plurality of cells comprises:
a sum-in register; and
summation circuitry configured to
receive, from the sum-in register, an accumulated value,
receive, from the multiplication circuitry, the product of the weight input and the
selected activation input, and
sum the accumulated value and the product.

12. A method for performing computations using a matrix computation unit comprising a systolic array of cells arranged along a first and a second dimension, the method comprising:
sending a first plurality of activation inputs to a first plurality of activation registers, respectively, within a first cell of the systolic array of cells;
sending a first weight input to the first cell;
sending a first multiplexer control signal to first multiplexer circuitry within the first cell, the first multiplexer circuitry being communicatively coupled to the first plurality of activation registers;
selecting, at the first multiplexer circuitry, a first activation input from the first plurality of activation registers, based on the first multiplexer control signal;
obtaining a first product of the first weight input and the first activation input;
sending the first plurality of activation inputs from the first plurality of activation registers to a second plurality of activation registers, respectively, within a second cell of the systolic array of cells.

13. The method of claim 12,
sending a second weight input to the second cell;
sending a second multiplexer control signal to second multiplexer circuitry within the second cell, the second multiplexer circuitry being communicatively coupled to the second plurality of activation registers;
selecting, at the second multiplexer circuitry, a second activation input from the second plurality of activation registers, based on the second multiplexer control signal;
obtaining a second product of the first weight input and the first activation input.

14. A method for performing computations using a matrix computation unit comprising a systolic array of cells arranged along a first and a second dimension, the method comprising:
sending a first activation input to a first cell of the systolic array of cells;
sending a first weight input to the first cell;
obtaining a first product of the first weight input and the first activation input;
obtaining a first accumulated sum based on the first product;
sending the first accumulated sum to demultiplexer circuitry within the first cell;
receiving a demultiplexer control signal at the demultiplexer circuitry; and
sending the first accumulated sum from the demultiplexer circuitry within the first cell to another sum-in register in a second adjacent cell along the second dimension or sending the accumulated sum to an escape line, depending on the value of the demultiplexer control signal.

15. The method of claim 14, comprising:
receiving, at the first cell, from a third adjacent cell along the second dimension, a previously summed value; and
obtaining the first accumulated sum by combining the previously summed value with the first product at summation circuitry within the first cell.

16. The method of claim 15, wherein sending the accumulated sum to the escape line comprises sending the accumulated sum to a sum register communicatively coupled to the escape line.

17. The method of claim 15, wherein sending the accumulated sum to the escape line comprises sending the accumulated sum to a vector computation unit communicatively coupled to the escape line.

18. A method for dynamically partitioning a matrix computation unit comprising a systolic array of cells arranged along a first dimension and a second dimension, the method comprising:
sending a plurality of activation inputs to each cell of a first plurality of cells along the first dimension;
selecting, at multiplexer circuitry within a first cell of the first plurality of cells, a first activation input from the plurality of activation inputs, and selecting at multiplexer circuitry within a second cell of the first plurality of cells a second activation input from the plurality of activation inputs;
obtaining, from each cell of the first plurality of cells along the first dimension, an accumulated sum based on the activation input selected in the cell;
sending the accumulated sum obtained in the first cell to demultiplexer circuitry within the first cell; and
sending the accumulated sum from the demultiplexer circuitry within the first cell to an escape line or to another sum-in register in another adjacent cell along the second dimension, depending on a value of a demultiplexer control signal.

19. The method of claim 18, further comprising:
sending, to the multiplexer circuitry within the first cell, a first multiplexer control signal, wherein selecting the first activation input is based on a value of the first multiplexer control signal; and
sending, to the multiplexer circuitry within the second cell, a second different multiplexer control signal, wherein selecting the second activation input is based on a value of the second different multiplexer control signal.

20. The method of claim 18, comprising sending the demultiplexer control signal to the demultiplexer circuitry, wherein the demultiplexer circuitry sends the accumulated sum to the escape line when the demultiplexer control signal has a first value, and wherein the demultiplexer circuitry sends the accumulated sum to the another sum-in register when the demultiplexer control signal has a second different value.

\* \* \* \* \*